(12) United States Patent
Roedig et al.

(10) Patent No.: US 8,960,543 B2
(45) Date of Patent: Feb. 24, 2015

(54) RFID READER AND APPARATUS WITH AN RFID READER

(71) Applicants: Michael Roedig, Wetzlar (DE); Torsten Gratzki, Essen (DE); Andreas Wennrich, Limburg-Straffel (DE)

(72) Inventors: Michael Roedig, Wetzlar (DE); Torsten Gratzki, Essen (DE); Andreas Wennrich, Limburg-Straffel (DE)

(73) Assignee: Feig Electronic GmbH (DE)

( * ) Notice: Subject to any disclaimer, the term of this patent is extended or adjusted under 35 U.S.C. 154(b) by 110 days.

(21) Appl. No.: 13/689,329

(22) Filed: Nov. 29, 2012

(65) Prior Publication Data

US 2013/0161389 A1    Jun. 27, 2013

(30) Foreign Application Priority Data

Dec. 2, 2011 (DE) .......................... 10 2011 055 970
May 24, 2012 (DE) .................... 20 2012 101 901 U
May 25, 2012 (EP) .................................. 12 169 434

(51) Int. Cl.
*G06K 7/00* (2006.01)
*G06K 7/10* (2006.01)
*H01Q 1/22* (2006.01)
*H01Q 7/00* (2006.01)

(52) U.S. Cl.
CPC .......... *G06K 7/10316* (2013.01); *H01Q 1/2216* (2013.01); *H01Q 7/00* (2013.01); *G06K 7/10217* (2013.01); *G06K 7/0008* (2013.01)
USPC .......................................... 235/439; 235/451

(58) Field of Classification Search
USPC .............. 235/439, 492, 451; 340/10.1, 572.1
See application file for complete search history.

(56) References Cited

U.S. PATENT DOCUMENTS

| | | | |
|---|---|---|---|
| 2007/0063820 A1 | 3/2007 | Kung | |
| 2010/0147959 A1* | 6/2010 | Tikhov et al. | 235/492 |
| 2011/0084810 A1* | 4/2011 | Witschnig et al. | 340/10.1 |
| 2014/0035728 A1* | 2/2014 | Lee et al. | 340/10.1 |

OTHER PUBLICATIONS

Finkenzeller Klaus: "RFID-Handbuch, Grundlagen und praktische Anwendungen induktiver Funkanlagen, Transponder und kontaktloser Chipkarten, Chapter 11—Lesegeraete", RFID Handbuch, Hanser Verlag, Muenchen, DE, Sep. 26, 2002, Seiten 319-339.

* cited by examiner

*Primary Examiner* — Ahshik Kim
(74) *Attorney, Agent, or Firm* — St. Onge Steward Johnston & Reens LLC

(57) ABSTRACT

An RFID reader that is situated in a recess of an apparatus housing, such that the apparatus housing is constituted of an electrically conductive material, and such that the RFID reader is configured as an RFID reader operating according to the "EMV Contactless Protocol Specification, Version 2.1, March 2011," such that the RFID antenna is situated in or on a plane constituted by the apparatus housing or inside the apparatus housing, such that the RFID reader has a transmitting power of more than 400 milliwatts, and that a quality factor (Q) of the RFID antenna is in a range between Q=12 and Q=20. In addition, the invention relates to an apparatus with an RFID reader of this type.

15 Claims, 6 Drawing Sheets

RFID READER AND APPARATUS WITH AN RFID READER

FIELD OF THE INVENTION

The invention relates to an RFID reader, in particular a read/write device of an RFID system for contactless data transmission, especially for reading and writing of contactless data carriers, so-called transponders. In addition, the invention relates to an apparatus with an RFID reader.

BACKGROUND OF THE INVENTION

An RFID reader—also referred to as a read/write device—of an RFID system, according to prior art, consists of an RFID antenna, which is composed of at least an antenna loop, which constitutes an inductivity and is made up of one or more coils, and of an tuning circuit. Said antenna is connected with a read/write station, which comprises a transmitter, receiver and control unit. The RFID antenna and read/write station here frequently constitute a structural unit and are referred to as an RFID reader.

The RFID antenna of an RFID system has the following tasks: first, to transmit power to the transponder and, second, to transmit data to and from the transponder. The power and data transmission is based on the magnetic coupling of the AC fields of the reader and of the transponder in the vicinity of the antennae. Here the shape of the RFID antenna has a decisive influence on the coupling to the transponder. The magnetic field strength that is effective for a transponder at a defined distance from the RFID antenna depends, among other factors, on the current that flows through the antenna and on the size of the RFID antenna.

One job of an RFID antenna is power transmission to the transponder. For this purpose the RFID antenna is itself supplied with power by a transmitter. To transmit current optimally from a power amplifier of the transmitter unit of the reader to the antenna, the power amplifier and RFID antenna must have the same input and/or output resistance (impedance). An RFID antenna therefore requires a particular input impedance so that power is transmitted optimally from the power amplifier to the antenna.

In addition, the reader antenna must be tuned as closely as possible to the operating frequency of the RFID system in order to ensure strong current and thus a high magnetic field strength.

To adjust the input or output impedance and to adapt the reader antenna to the operating frequency, a tuning circuit is used that is placed usually in the immediate proximity of the antenna.

Transponders are known in the art that consist of a microelectronic component or integrated circuit (IC) and of a resonance capacitor and an antenna coil, such that the resonance capacitor is often already integrated into the microelectronic component. The antenna coil and resonance capacitor form an electrical oscillator circuit and are tuned to their operating frequency of, for instance, 13.56 megahertz (MHz).

If a transponder comes into the RFID antenna's detection range, then the transponder receives power via the magnetic coupling with the antenna to operate the integrated switch (IC). The power level depends on the field strength and/or the number of field lines that penetrate the transponder, and the angle of the field lines to the transponder. With sufficient power, the microelectronic component is set into startup condition and starts to function.

The range in which the transponder is adequately supplied with power and can communicate with the RFID system is called the detection range.

If the vicinity of a tuned RFID antenna is modified, such as if the RFID antenna is installed close to a metallic plate, then said RFID antenna is detuned by this environment, that is, the antenna no longer operates at the previously adjusted operating point. Because of this changed environment of the RFID antenna, communication with transponders is adversely affected because the maximum possible power is no longer available in the antenna.

Multiple applications for RFID readers are possible. RFID readers are used, for example, for access control systems, ticketing systems, in libraries and logistical applications, and in electronic payment systems. Thus RFID readers are installed on the walls of houses or in automatic machines and terminals or integrated into mobile devices. RFID readers are found today, for instance, on ticket automats, drink vending machines, or turnstiles at recreational facilities, and so on. In such cases, RFID readers are often operated in the direct vicinity of metallic or otherwise electrically conductive materials. It is thus a requirement that the RFID reader should be capable of operating in different environments and of being integrated as well as possible into the particular environment. Its structure must therefore be designed to allow the simplest possible integration into other devices, such as terminals, and thus to let it function optimally, independently of surrounding structures.

One field of application is the so-called payment systems. These payment systems include the EMV® Contactless Specifications for Payment Systems, Book D, EMV Contactless Communication Protocol Specification Version 2.1, March 2011 (also referred to hereinafter as EMVco specification), which was established by current suppliers of credit cards and accordingly is to be maintained.

The EMVco specification defines an "operating volume" as an area above the RFID antenna in which a minimum field strength must be reached but a maximum admissible field strength may not be exceeded. In addition, the EMVco specification defines the signal forms generated by the RFID reader within the operating volume for communication with a transponder.

Apparatuses are known in the art that serve to tune an RFID antenna manually or automatically to its optimal working point. These apparatuses have the disadvantage, however, that they are relatively complex and are not economically usable for small, cheap RFID readers or else are complex to operate and require trained staff and expensive measuring instruments for precise adjustment.

Also known in the art are RFID readers that can be screwed onto the surface of a device, for example an automatic teller machine. To allow RFID antennae of these RFID readers also to be installed on a metallic base, it is common to install between the RFID antenna and the installation surface a ferrite layer, which shields the antennae from the metallic base. This structure of the mounted RFID reader has the disadvantage that the RFID readers cannot blend into the visual design of the automat and can be protected from vandalism only with difficulty.

The prior art includes RFID readers that correspond to the EMVco specification and comprise a housing conceived for installation onto flat surfaces. The housings of these RFID readers have, for example, a surface measuring 70 mm by 60 mm and a thickness of 18 mm or a surface of 100 mm by 70 mm and a thickness of 16 mm and meet requirements in terms of field strength and signal shapes of the EMVco specification provided they are not installed on a metallic base. By being mounted on a metallic base, however, these antennae of RFID readers known in the art are detuned and the antenna induces a great part of the generated power into the metallic base, so that neither the minimum field strength required by EMVco specification of all points of the operating volume is measurable, nor do the signal shapes correspond to EMVco specification. Even if the antenna of such an RFID reader were again tuned to the metallic base, and the antenna would again operate at its functional point, these RFID readers do not reach the required minimal field strength in this environmental situation, although the antennae of these RFID readers known in the art are at a distance of more than 10 mm from the metallic base.

An antenna of an RFID reader with an antenna surface measuring, for example, 65 mm by 55 mm requires a transmitting power of about 250 milliwatts (mW) to reach the minimum field strength at the upper border of the operating volume according to the EMVco specification if the antenna is not influenced by metal. If this antenna is brought within 10 mm of a metallic surface, the RFID reader already requires approximately 600 mW to reach the minimum field strength at the upper border of the operating volume.

SUMMARY OF THE INVENTION

The technical object of this invention consists in providing an RFID reader that, because of its shape, can be easily integrated into different devices (terminals) and which at the same can be used independently of the surrounding material while offering strong protection against vandalism.
This technical object is achieved by an RFID reader having at least one RFID antenna and at least one tuning circuit, such that the RFID reader is situated in a recess of a housing of an apparatus, such that the apparatus housing of the apparatus is constituted of an electrically conductive material, characterized in that the at least one RFID antenna is situated in a plane constituted by the apparatus housing, or that the at least one RFID antenna is situated inside the apparatus housing, or that the RFID antenna is situated bordering on the plane constituted by the apparatus housing, that the RFID reader is configured as an RFID reader operating according to the "EMV® Contactless Specifications for Payment Systems, Book D, Communication Protocol Specification, Version 2.1, March 2011," that the RFID reader has a transmitting power of more than 400 milliwatts, and that a quality factor for the RFID antenna is in a range between Q=12 and Q=20. This technical object is also achieved by an apparatus with an RFID reader having at least one RFID antenna and at least one tuning circuit, such that the RFID reader is situated in a recess of a housing of an apparatus, such that the apparatus housing of the apparatus is configured of an electrically conductive material, characterized in that the at least one RFID antenna is situated in a plane constituted by the apparatus housing, or that the at least one RFID antenna is situated inside the apparatus housing, or that the RFID antenna is situated bordering on the plane constituted by the apparatus housing, that the RFID reader is configured as an RFID reader operating according to the "EMV® Contactless Specifications for Payment Systems, Book D, EMV Contactless Communication Protocol Specification, Version 2.1, March 2011," that the RFID reader has a transmitting power of more than 400 milliwatts, and that a quality factor for the RFID antenna is in a range between Q=12 and Q=20.

The inventive RFID reader with at least one RFID antenna and at least one tuning circuit, such that the RFID reader is placed in a recess in a housing of an apparatus, such that the apparatus housing of the apparatus is made of an electrically conductive material, is characterized in that the at least one RFID antenna is placed in a plane constituted by the apparatus housing, or that the at least one RFID antenna is placed within the apparatus housing, or that the RFID antenna is placed bordering on the plane constituted by the apparatus housing, that the RFID reader is configured as an RFID reader operating according to the "EMV® Contactless Specifications for Payment Systems, Book D, EMV Contactless Communication Protocol Specification, Version 2.1, March 2011," that the RFID reader has a transmitting power of more than 400 milliwatts, and that a quality factor (Q) for the RFID antenna is in a range between Q=12 and Q=20.

The inventive RFID reader, thanks to these features, has the advantage that because of its geometric shape it can be integrated very well into different apparatuses. Because of the arrangement of the antenna in the plane constituted by the apparatus housing, on said plane or within the apparatus housing, the reader housing is enclosed by flush-mounting or almost flush-mounting, providing very strong protection against vandalism.

In addition, the inventive RFID reader has a transmitting capacity of more than 400 milliwatts, and a Q factor for the RFID antenna is situated in a range between Q=12 and Q=20.

The transmitting power of the inventive RFID reader is greater than 400 milliwatts and typically less than 1 watt. With a transmitting capacity of more than 1 watt, the object of the invention can also be achieved, although it would result in an uneconomically high cost for components and would require complex, costly power supply.

An antenna with too high Q factor is capable to generate a high field strength with low output power, but it has a high time constant and therefore cannot transmit rapid impulses.

The Q factor for an antenna of the inventive RFID reader is in a range between Q=12 and Q=20. A lower quality would require high transmitting power to reach the minimum value for the field strength. With a higher quality factor, the demands for the modulation impulses cannot be met.

In addition, the inventive RFID reader meets the requirements according to the EMVco specification; that is, it reaches a minimum field strength in the upper border area of an operating volume, does not exceed the maximum admissible field strength within the operating volume, and the predetermined signal forms within the operating volume are respected.

These conditions are stated in the aforementioned protocol in accordance with the EMVco specification, and the various definitions are listed on pages 4 and 5. On page 17 the "TEST PICC" (Proximity IC Card) for determining field strength and measuring signal forms is described. On page 18 the Landing Plane is described; that is, the area into which the test apparatus must be brought. A theoretical description of the operating volume is provided on pages 18 and 19. On page 199 the operating volume is described with the definition of the geometric dimensions.

The text on pages 200 and 201, under the heading "RF Power and Signal Interface," gives a definition for the minimum and maximum field strengths, that is, the voltages within the operating volume that must be measured with the TEST PICC.

The field strength is determined by measuring a voltage on the "EMC-TEST PICC" (measurement transponder to ascertain field strength and measurement of signal forms), which is moved within the operating volume. Here the TEST PICC constitutes a defined load for the electro-magnetic field that is generated by the PCD (proximity coupling device) which corresponds to the read/write station or the reader, such that the PCD induces a voltage in the TEST PICC that can be measured as equivalent for the field strength at an output of the TEST PICC.

The "PCD Requirements for Modulation PCD to PICC—Type A" defines the requirements of signal forms, which the PCD must generate for ISO/IEC 14443 Type A transponders, such that these requirements again are valid for the entire operating volume (Table A.2).

The "PCD Requirements for Modulation PCD to PICC—Type B" defines the requirements of signal forms, which the PCD must generate for ISO/IEC 14443 Type B transponders, such that these requirements again are valid for the entire operating volume (Table A.2).

Found on page 202 are the "Set-Up Values for Test Equipment," which define the threshold values that are to be measured for "PCD Requirements for Modulation PCD to PICC—Type A" and "PCD Requirements for Modulation PCD to PICC—Type B."

The inventive RFID reader thus has the advantage that it meets the EMVco specification with respect to field strength and signal forms, and in addition is very compact in structure and thus can be built into apparatuses with an electrically conductive apparatus housing.

The electrically conductive apparatus housing is of metallic construction as a rule. It is also possible, however, for the apparatus housing to be made up of carbon fiber materials.

According to an advantageous embodiment, the at least one RFID antenna is enclosed in a surrounding shielding ring. Consequently, the RFID reader is not affected by the material in the environment, that is, the apparatus housing. The shielding ring is applied most advantageously when the apparatus housing is made up of a non-electrically conductive substance.

Relevant parameters for the inventive RFID reader are as follows:
1. The geometric shape of the antenna (dimension, shape, conductor path thickness, distance to the shield)
2. The geometric shape and structure of the shield
3. The electrical dimensions of the antenna (antenna quality)
4. Output power of the RFID reader As a result of the inventive combination of these parameters in the RFID reader, it is possible for the first time to configure the RFID reader in such a way that it fulfills the EMVco specification and nevertheless the antenna is located close to the housing of the apparatus, so that the housing of the RFID reader does not protrude, or scarcely protrudes, above the housing of the apparatus and thus is well protected from vandalism. The RFID readers known in the art either protrude markedly above the apparatus housing or fail to fulfill the EMVco specification.

The antenna of the RFID reader fulfills the required task simplest if the reader housing surface is of greater size.

Because the inventive RFID reader is preferably intended to be used in payment systems at automats, the part visible from the exterior in the built-in state should advantageously be no greater than 100 mm by 100 mm or no greater than 100 mm in diameter.

The entire RFID reader is greater than the part visible from the exterior, because the RFID reader advantageously comprises means for disposing the RFID reader in an apparatus. These means can be, for example, a flange by which the RFID becomes larger than the visible part of the RFID reader.

A preferred embodiment of the invention provides that the part of the reader housing of the RFID reader that is visible from the exterior in the built-in state is no greater than 85 mm by 85 mm or no greater in diameter than 85 mm.

A small antenna, however, has the disadvantage that a smaller coupling exists between reader antenna and transponder antenna. A geometric relation exists between the reader antenna and the transponder antenna.

According to the EMVco specification, the field strength is measured with a measurement transponder whose dimensions correspond to a credit card. A reader antenna with similar geometry results in a good coupling.

If a transponder is kept close to a reader antenna, both oscillator circuits form one coupled oscillator circuit. Too good a coupling here has the disadvantage that the transponder oscillator circuit strongly influences the antenna oscillator circuit. The reader antenna becomes detuned, with the consequence that the signal forms (modulation impulses) are modified.

The shielding ring has the task of a virtual metal housing. That is, the shielding ring already operates in similar manner as a metallic housing or a metallic front plate of an apparatus into which the reader is installed. Thus the antenna, even before being installed, is tuned to the surrounding conditions in which it must operate after being installed.

The diameter of the RFID antenna is advantageously less than 80 mm on the outside and more than 50 mm on the inside. The diameter of the RFID antenna is advantageously 70 mm on the outside and 60 mm on the inside.

The at least one RFID antenna advantageously comprises a protective ring with a material thickness of at least 0.5 mm and at most 1 mm. A thickness of 0.8 mm is preferred.

An additional advantageous embodiment of the invention provides that the reader housing of the RFID reader has a wall thickness of at least 2.5 mm and at most 4 mm. The especially preferred dimension is 3.5 mm.

The reader housing is configured as closed or open on the side facing the apparatus. In any case, a front surface of the reader housing is configured as closed.

In addition, it is advantageous for realizing the compact construction if, at one or several or all points at which the RFID antenna is at the shortest distance from the shielding ring or from the apparatus housing, the at least one RFID antenna is at a distance of 2 to 8 mm from the shielding ring or from the apparatus housing.

In principle it is advantageous to select the greatest possible distance between the antenna and the shielding ring or apparatus housing. It is also possible to position the shielding ring outside on the reader housing of the RFID reader.

According to another advantageous embodiment of the invention, the RFID reader is characterized in that the shielding ring is positioned inside the housing of the RFID reader, and in that the shielding ring has dimensions of at least 70 mm by 70 mm and at most 85 mm by 85 mm.

The at least one RFID reader is advantageously configured with a cross-section that is square, round, rectangular, elliptical or multi-angular. It is also possible to foresee other shapes.

The at least one RFID antenna can be positioned in the RFID reader in round, square, rectangular or multi-angular form. Here too, other shapes are possible.

A particularly preferred embodiment of the invention foresees that the antenna should have a round shape and the shielding ring or reader housing should have a square shape. The round shape of the antenna has the advantage that a round antenna generates a very homogeneous field. The round antenna in the square protective ring or square reader housing has the advantage that the distance between the antenna and the protective ring or apparatus housing, whose recess is configured to adapt to the reader housing, is of maximum size at least in the corners, so that the field lines of the antenna can spread out well in the distance.

It is advantageous if the at least one RFID antenna is located in a reader housing and said reader housing comprises a flange plate. As a result of this embodiment, the RFID reader can be mounted in or on an apparatus housing in a simple manner.

The inventive RFID reader should advantageously foresee a reader housing with a closed front side and a square or at least quasi-rectangular flange plate connected with the reader housing, such that the reader housing with its front side extends from behind through a round opening of a front plate of a housing of an apparatus, an arrangement that corresponds to a pass-through mounting. The front side of the reader housing and the outside of the front plate of the apparatus are at least approximately flush-mounted with one another, or the reader housing of the RFID reader extends out beyond the apparatus housing by a wall thickness of the reader housing. The reader housing is joined by screws with the front plate of the apparatus (terminal) through the flange plate in the interior. According to the invention, the at least one RFID antenna is situated in the reader housing.

The RFID antenna and/or electronic components are advantageously embedded in a synthetic mass. This ensures that the RFID antenna and/or the electronic components are protected from environmental impact and are not worn by abrasion very rapidly.

According to the invention, in addition, an apparatus with an RFID reader with at least one RFID antenna and at least one tuning circuit is placed under protection, such that the RFID reader is situated in a recess in a housing of an apparatus, such that the apparatus housing of the apparatus is made of an electrically conductive material, and said apparatus is characterized in that the at least one RFID antenna is situated in a plane constituted by the apparatus housing or that the at least one RFID antenna is situated inside the apparatus housing or that the RFID antenna is situated bordering on the plane constituted by the apparatus housing, that the RFID reader is configured as an RFID reader operating according to the EMVco specification, that the RFID reader has a transmitting power of more than 400 milliwatts, and that a quality factor of the RFID antenna is in a range between Q=12 and Q=20.

The term "apparatus" hereinafter is understood to mean, for example, an apparatus for access control systems, ticketing systems, in libraries and logistical applications. The inventive apparatus is especially preferably configured as an electronic payment system. The apparatus can also be configured as a ticketing automat, a drink automat, or as a turnstile for entertainment facilities and the like. The apparatus can also be configured for other applications.

The inventive apparatus comprises an inventive RFID reader. That is, the apparatus comprises an RFID reader that can comprise all described features and advantages singly or in combination.

Because of the configuration whereby the RFID reader is situated in the application housing and the at least one RFID antenna is mounted in a plane constituted by the apparatus housing or is mounted inside the apparatus housing or is mounted bordering on the plane constituted by the apparatus housing, the reader housing of the RFID reader extends only minimally or not at all beyond the apparatus housing and is thus well protected from vandalism.

The RFID reader is advantageously situated in the apparatus housing in such a way that the reader housing of the RFID reader extends beyond the apparatus housing only by one material thickness of the housing of the RFID reader. This configuration likewise offers good protection from vandalism.

A cylindrical structure of the reader housing has the advantage that the required installation surface in relation to the diameter of the RFID antenna is optimally taken advantage of, because the field strength that can be effectively used for a transponder when there is a round RFID antenna is almost identical to a square antenna with the edge length that corresponds to the diameter of the round antenna.

The flange plate advantageously comprises a rectangular base surface.

The square or rectangular flange plate has the advantage that it comprises in the corners apparatuses for installing the RFID reader on the installation surface that are executed, for example, as bore-holes. Because of the combination of a cylindrical body, which is mounted on a square or rectangular base body, the available installation site for the RFID antenna or RFID reader is optimally used.

According to an additional advantageous embodiment of the invention, the reader housing of the RFID reader is configured as enclosed by at least a shielding ring on a mantle of the reader housing. The shielding ring here can be applied outside on the reader housing or can be situated on the inside of the reader housing or integrated into the reader housing. The shielding ring in any case is mounted so that it surrounds the inside RFID antenna at a distance that is as great as possible. In addition, the shielding ring can have an axial length that corresponds at least to the thickness of the housing of the apparatus. The shielding ring can also have an axial length that corresponds to the axial length of the reader housing. Other lengths are also possible.

According to this advantageous embodiment, the shielding ring can be configured as a band or ring of metal or of a ferrite material. This embodiment has the advantage that the RFID antenna of the RFID reader can already be tuned to a metallic surrounding on the factory side and the tuning of the RFID antenna is independent of the installation location.

According to the invention, the reader housing is configured as closed on the front side in order to protect the RFID antenna and the entire apparatus.

The geometric shape of the reader housing is independent of application, according to the apparatus into which the inventive RFID reader is to be installed. In the part of the reader housing facing the apparatus, electronic components of the RFID reader, for example, and plug-in connections or connecting clamps, for example, can be installed.

The RFID reader is advantageously situated in a type of pass-through installation in a corresponding recess in an apparatus housing of the apparatus. As a result the reader housing is pushed through the bore-hole and the flange plate is situated flush with the inner wall of the apparatus housing of the apparatus. The flange plate can then be firmly connected, for instance by screws, with the apparatus housing of the apparatus.

An additional advantageous embodiment foresees an adjustment mechanism with which the front side of the reader housing can be adjusted in such a way that the reader housing of the apparatus and the front side of the reader housing of the RFID reader are configured as at least nearly flush with one another.

This embodiment has the advantage that the RFID reader can be built flush into apparatuses with walls of varying thickness.

Because of the push-through installation of the reader housing and the termination of the reader housing at least nearly flush with the apparatus housing of the apparatus, the invention achieves very good protection from vandalism and very good incorporation into the optical appearance of the apparatus, into which the inventive RFID reader is installed.

According to an especially preferred embodiment of the invention, a shielding foil or shielding plate, for example a ferrite foil or ferrite plate, is situated on the back of the RFID reader, that is, on the side facing the apparatus housing, preferably in the area of the antenna.

The diameter of the shielding foil or shielding plate is advantageously somewhat greater than the diameter of the antenna. The shielding layer serves to guide the field lines running between the antenna and the shielding ring back to the center of the antenna with as little loss as possible. Because of the high permeability and/or the low magnetic resistance of the shielding material and/or of ferrite, the electromagnetic field generated by the antenna is bundled about the antenna.

The output power of the RFID reader is partly responsible for the field strength of the antenna that can be achieved.

It should be observed here that the field strength within the operating volume required by the EMVco specification must reach a defined minimum value, but may not exceed a defined maximum value.

With too great transmission power, it is possible to reach the minimum value but this would exceed the maximum value. These conditions are met by the inventive RFID reader.

Because the EMVco specification defines very precisely the admissible shapes for modulation impulses (transition steepness and continuity of the amplitude modulated signals) that are transmitted by the reader or PCB to the transponder/PICC, the antenna quality must accordingly be selected so that these modulation impulses conform to the EMVco specification. There is a direct relation between transmission power and antenna.

Further features and advantages of the invention can be seen from the appended drawings, which depict several embodiments of an RFID reader in purely exemplary manner.

DETAILED DESCRIPTION OF THE INVENTION

Figure 1:
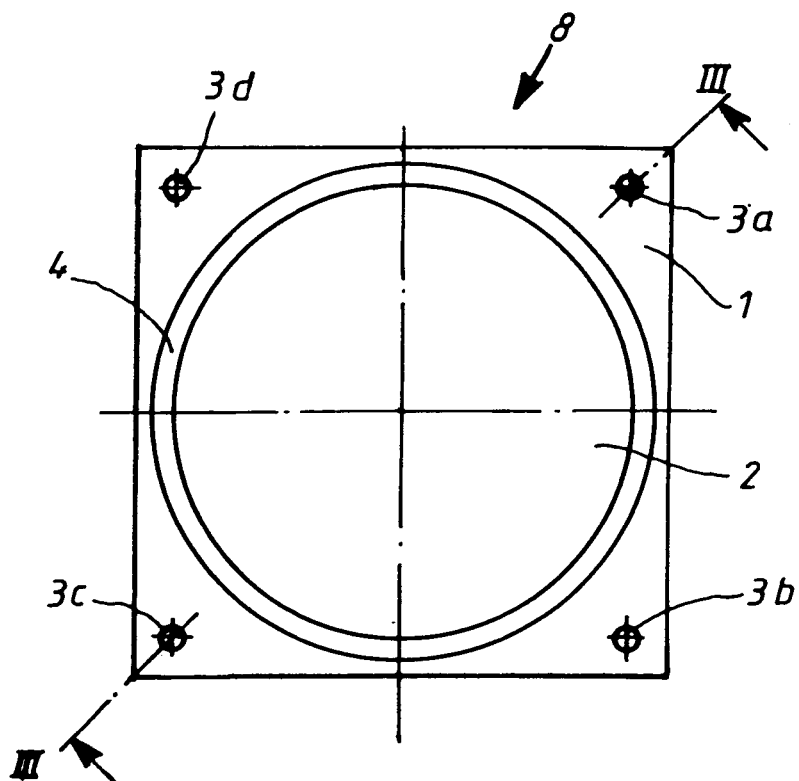
FIG. 1 shows a front view of an embodiment of an RFID reader.

FIG. 1 shows by way of example a front view of an embodiment of an inventive RFID reader 8. Here a cylindrical reader housing 2 is connected with a square flange plate 1, such that the edge length of the flange plate 1 is only slightly greater than the diameter of the reader housing 2. In each of the four corners of the flange plate 1, a screw-on point 3a, 3b, 3c, 3d is provided. The RFID reader can be screwed to the installation plate via the screw-on points 3a, 3b, 3c, 3d. The flange plate 1 is situated on the reader housing 2 surrounding it and is firmly connected with it.

The cylindrical reader housing 2 is additionally enclosed in this embodiment by a shielding ring 4, which can be produced from a metallic material or from ferrite.

Figure 2:
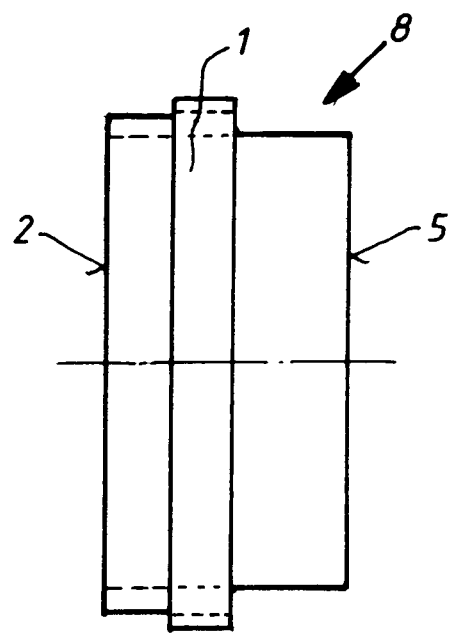
FIG. 2 shows the side view of an embodiment of an RFID reader.

FIG. 2 shows by way of example a side view of an inventive RFID reader 8. This view shows the arrangement of the cylindrical reader housing 2 and flange plate 1. Also shown in FIG. 2 is a rear part 5 of the reader housing 2. The geometric shape of the rear part 5 of the reader housing 2 depends on the application. In the rear part 5 of the reader housing 2, additional electronic components of the RFID reader 8 and, for example, plug-in connections or connecting clamps (not shown) can be situated. The reader housing 2 is configured as open on the side toward the apparatus housing 7.

Figure 3:
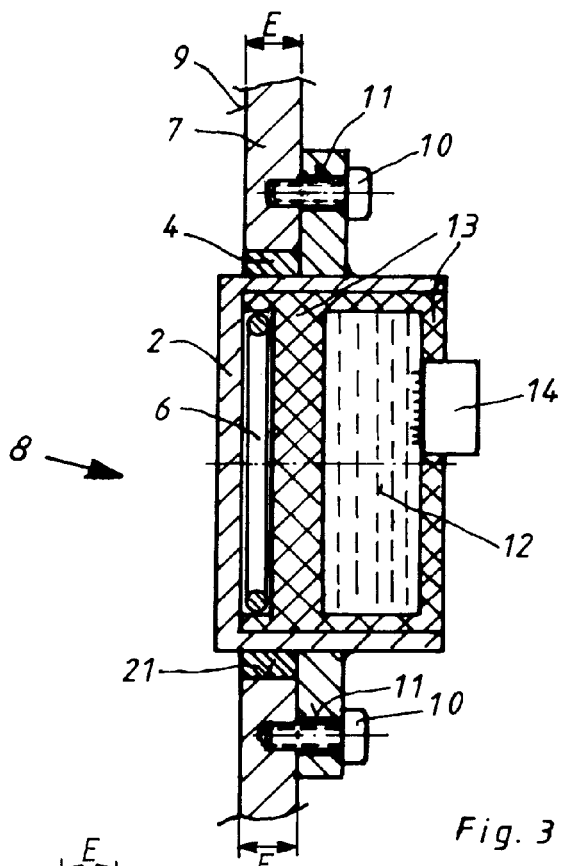
FIG. 3 shows a longitudinal section through an embodiment of an RFID reader in built-in condition according to the line III-III in FIG. 1.

FIG. 3 shows a section through an inventive RFID reader 8 built into an apparatus 7 of a terminal (not shown), such that the front of the RFID reader 8 aligns nearly flush with an outer side of the apparatus housing 7. The reader housing 2 extends beyond the apparatus housing 7 only by a distance of a wall thickness of the reader housing 2. An RFID antenna 6 is mounted in the interior of the RFID reader 8, such that the RFID antenna 6 is placed in the cylindrical reader housing 2. The flange plate 1 in turn is firmly connected with the reader housing 2; for example, the flange plate 1 and the reader housing 2 are configured as soldered together or as a one-piece unit, for example, produced by a projection molding or sintering process. The screws 10 grip through bore-holes 11 in the flange plate 1.

The RFID antenna 6 situated in the interior of the reader housing 2 and all further electronic components 12 are embedded in a synthetic mass 13, from which only the plug-in connections 14 extend out. FIG. 3 shows likewise a shielding ring 6, which encloses the ring-shaped RFID antenna 6 in ring-shaped manner. The flange plate 1 is screwed to the apparatus housing 7 by screws 10.

Because of the embedding of the electronic components in a synthetic mass 13, very good protection is provided from vandalism and environmental impacts.

The RFID antenna 6 is situated in a plane E constituted by the apparatus housing 7 of the apparatus 9. As a result of this embodiment, the reader housing 2 of the RFID reader 8 extends beyond the apparatus housing 7 of the apparatus only by a material thickness of the reader housing 2. The RFID reader 8 is situated in a recess 21 of the apparatus housing 7.

Figure 4:
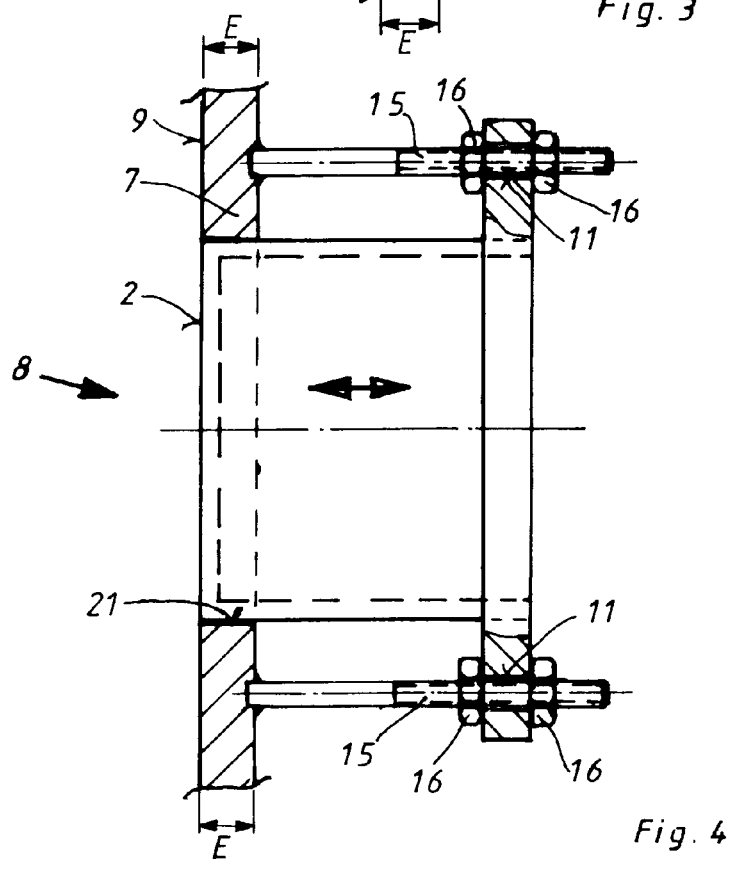
FIG. 4 shows a partial section through an embodiment of an RFID reader with adjustment mechanism in built-in condition.

FIG. 4 shows an embodiment of an inventive RFID reader 8. FIG. 4 shows an arrangement of the cylindrical reader housing 2 and of the flange plate 1. In this embodiment the flange plate 1 is positioned at a distance from the inside of the apparatus housing 7, into which the RFID reader 8 is installed. The flange plate 1 is held by nuts 16 on threaded bolts 15, such that the front of the RFID reader can be adjusted by the position of the nuts 16 on the threaded bolts 15 so that it can be built into the apparatus with its surface flush. The threaded bolts 15 are firmly connected, for example soldered, with the reader housing 7.

Figure 5:
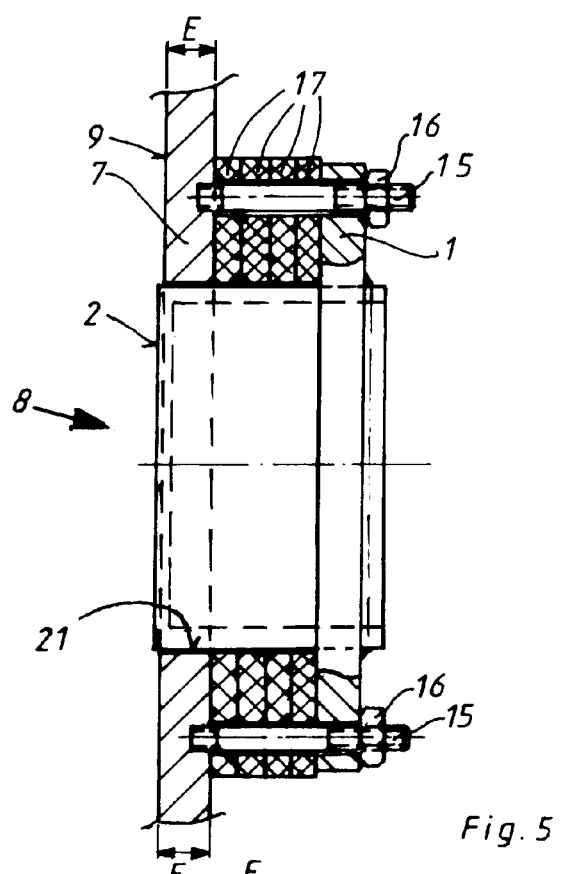
FIG. 5 shows a longitudinal section through an additional embodiment of an RFID reader with adjustment mechanism in built-in condition.

FIG. 5 shows an additional embodiment of an inventive RFID reader 8. FIG. 5 again depicts the arrangement of the cylindrical reader housing 1 and of the flange plate 1. Also in this embodiment, the flange plate 1 is positioned at a distance from the inside of the apparatus housing 7, into which the RFID reader 8 is installed. The flange plate 1 is held by interspersed distancing pieces 17 by means of threaded bolts 15, such that the front of the RFID reader 8 can be adjusted by the thickness and number of the distancing pieces 17 so that it can be built into the apparatus housing 7 with its surface flush. This embodiment has the advantage that good insulation can be achieved between the RFID reader 8 and the apparatus housing 7.

Figure 6:
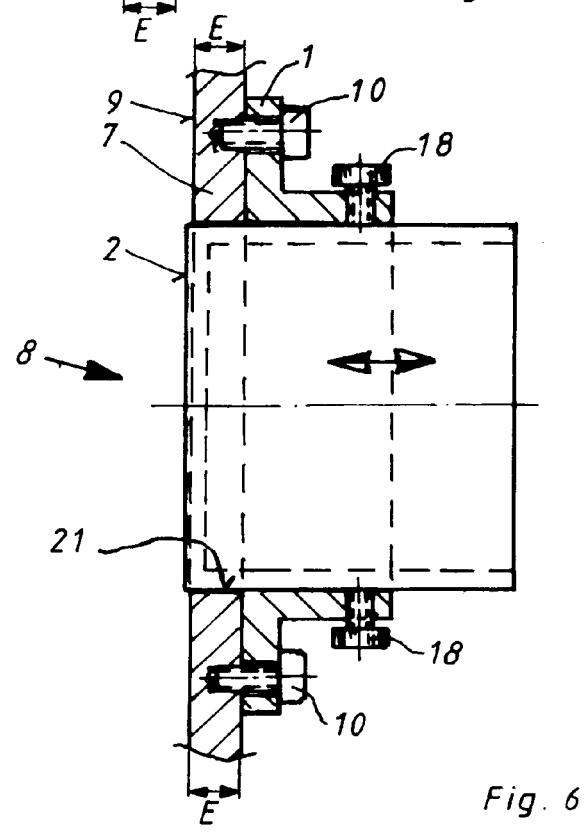
FIG. 6 shows a modified embodiment in longitudinal section.

FIG. 6 shows an additional embodiment of an inventive RFID reader 8. Also shown again in FIG. 6 is the arrangement of the cylindrical reader housing 2 and of the flange plate 1. The flange plate 1 is fastened (flange fastening) to the RFID reader by screws 18. Instead of the screws 18, the flange fastening can also be executed as a clamping device (not shown). The flange plate 1 here is directly contiguous with the inside of the apparatus housing 7, in which the RFID reader 8 is installed. By releasing the flange fastening 18, the front of the RFID reader 8 can be adjusted so that it can be built into the apparatus housing 7 with its surface flush.

Figure 7:
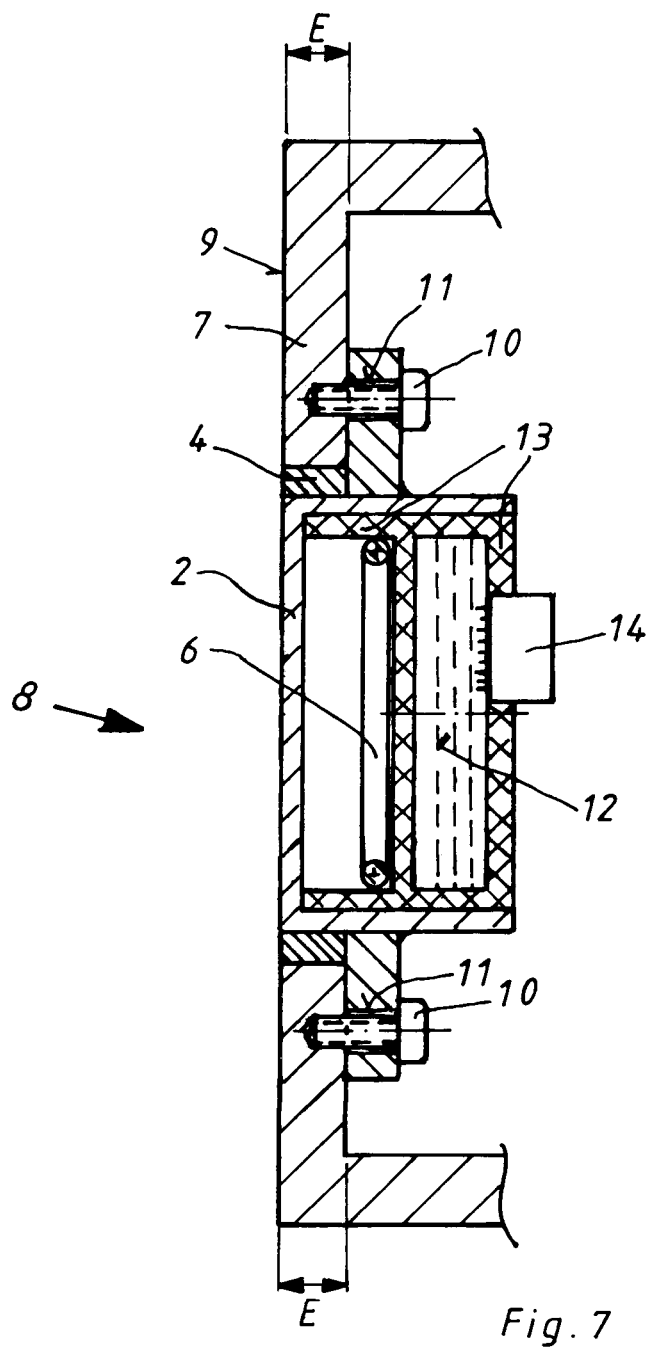
FIG. 7 shows a modified embodiment in longitudinal section.

FIG. 7 shows an RFID reader 8, which is built into the apparatus housing 7 in the same manner as shown in FIG. 3. Identical parts are labeled with the same reference numbers. The fastening of the RFID reader 8 is analogous to the fastening described in FIG. 3. The RFID reader 8, however, is structured in such a way that the antenna 6 is mounted inside the apparatus, which is constituted by the apparatus housing 7. That is, the antenna 6 is not situated in the plane E. Because of this configuration it is possible that the reader housing 2 terminates flush with the apparatus housing 7.

Figure 8:
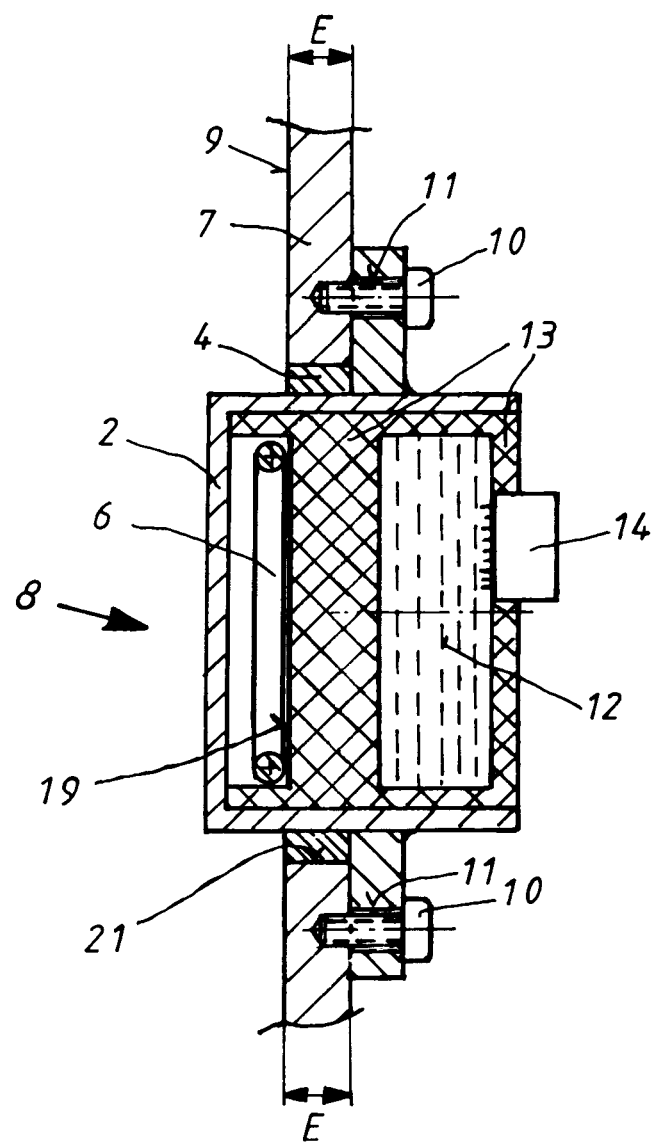
FIG. 8 shows a modified embodiment in longitudinal section.

FIG. 8 shows an RFID reader 8, which is built into the apparatus housing 7 in the same manner as shown in FIG. 3. Identical parts are labeled with the same reference numbers. The fastening of the RFID reader 8 is analogous to the fastening described in FIG. 3. The plane E, which is constituted by the apparatus housing 7, comprises a boundary line 19, which is shown as a broken line in FIG. 8. The boundary line 19 runs inside the recess 21 in the apparatus housing 7. The antenna 6 is configured as contiguous with the boundary line 19. This ensures that the reader housing 2 does not extend too far beyond the apparatus housing 7 and thus is still sufficiently protected from vandalism.

Figure 9:
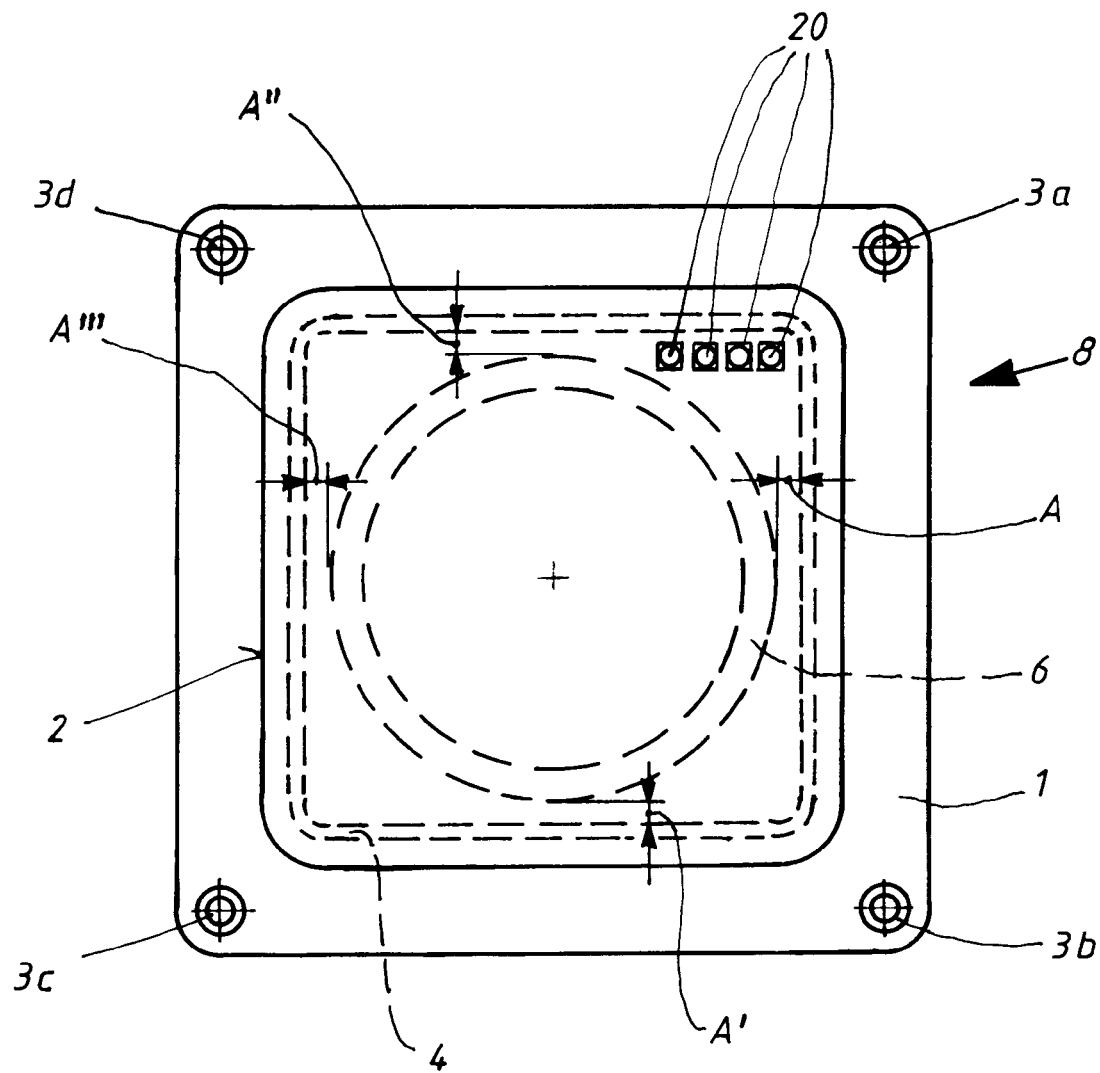
FIG. 9 shows an inventive RFID reader in overhead view.

FIG. 9 shows an RFID reader 8 with an antenna 6 as well as with a shielding ring 4. The flange plate 1, like the shielding ring 4, is of square configuration, while the antenna 6 has a round shape. If the RFID reader 8 is built into an apparatus (not shown in FIG. 7), the front part of the reader housing 2 is visible while the flange 1 is not visible. Four LEDs 20 are situated in the surface of the RFID reader 8.

The RFID reader 8 comprises the RFID antenna 6. At point A the smallest distance is the distance between the antenna 6 and the shielding ring 4, or if the shielding ring 4 is absent, the apparatus housing 7. At point A the distance between the antenna 6 and the shielding ring 4 or apparatus housing 7 should be as small as possible. Depending on the geometric shape, there are several points A for one RFID reader. In the present case there are a total of four points A, A', A", A'".

What is claimed is:

1. An RFID reader having at least one RFID antenna and at least one tuning circuit, such that the RFID reader is situated in a recess of a housing of an apparatus, such that the apparatus housing of the apparatus is constituted of an electrically conductive material,
characterized in that
the at least one RFID antenna is situated in a location selected from the group consisting of a plane constituted by the apparatus housing; inside the apparatus housing; and bordering on the plane constituted by the apparatus housing;
that the RFID reader is configured as an RFID reader operating according to the "EMV® Contactless Specifications for Payment Systems, Book D, Communication Protocol Specification, Version 2.1, March 2011;"
that the RFID reader has a transmitting power of more than 400 milliwatts; and,
that a quality factor for the RFID antenna is in a range between 12 and 20.

2. The RFID reader according to claim 1, wherein a part of the reader housing of the RFID reader visible from the outside in built-in position has a maximum dimension of 100 mm by 100 mm or a maximum diameter of 100 mm.

3. The RFID reader according to claim 1, wherein a part of the reader housing of the RFID reader visible from the outside in built-in position has a maximum dimension of 85 mm by 85 mm or a maximum diameter of 85 mm.

4. The RFID reader according to claim 1, wherein the diameter of the RFID antenna is less than 80 mm on the outside and more than 50 mm on the inside.

5. The RFID reader according to claim 1, wherein the at least one RFID antenna is enclosed by a surrounding shielding ring.

6. The RFID reader according to claim 1, wherein, at least one point at which the RFID antenna is at a smallest distance from the shielding ring or from the apparatus housing, the at least one RFID antenna is at a distance from the shielding ring or from the apparatus housing of 2 to 8 mm.

7. The RFID reader according to claim 1, wherein the reader housing of the RFID reader is configured as having a square, round, rectangular, elliptical or multi-angular cross-section.

8. The RFID reader according to claim 1, wherein the at least one antenna is situated in the RFID reader in round, square, rectangular or multi-angular shape.

9. The RFID reader according claim 1, wherein the RFID antenna has a round shape and the shielding ring and/or reader housing has a square shape.

10. The RFID reader according to claim 1, wherein the at least one RFID antenna is situated in the reader housing, and that the reader housing comprises a flange plate.

11. The RFID reader according to claim 1, wherein the RFID antenna and/or electronic components are embedded in a synthetic mass inside the RFID reader.

12. The RFID reader according to claim 1 wherein the RFID reader comprises a shielding foil or shielding plate in the area of the at least one RFID antenna on the side facing the apparatus.

13. The RFID reader according to claim 12, wherein the shielding foil or shielding plate is configured as ferrite foil or ferrite plate.

14. An apparatus with an RFID reader having at least one RFID antenna and at least one tuning circuit, such that the RFID reader is situated in a recess of a housing of an apparatus, such that the apparatus housing of the apparatus is configured of an electrically conductive material
characterized in that
the at least one RFID antenna is situated in a plane constituted by the apparatus housing, or that the at least one RFID antenna is situated inside the apparatus housing, or that the RFID antenna is situated bordering on the plane constituted by the apparatus housing, that the RFID reader is configured as an RFID reader operating according to the "EMV® Contactless Specifications for Payment Systems, Book D, EMV Contactless Communication Protocol Specification, Version 2.1, March 2011," that the RFID reader has a transmitting power of more than 400 milliwatts, and that a quality factor for the RFID antenna is in a range between 12 and 20.

15. The apparatus according to claim 14, wherein the RFID reader is situated in the apparatus housing in such a way that the reader housing of the RFID reader extends beyond the apparatus housing only by a thickness of the reader housing material.

* * * * *